July 23, 1946.　　　　E. V. MORAN　　　　2,404,518
TRACTOR IMPLEMENT
Filed Feb. 27, 1941　　　　3 Sheets-Sheet 1

INVENTOR
Edward V. Moran
BY
ATTORNEY

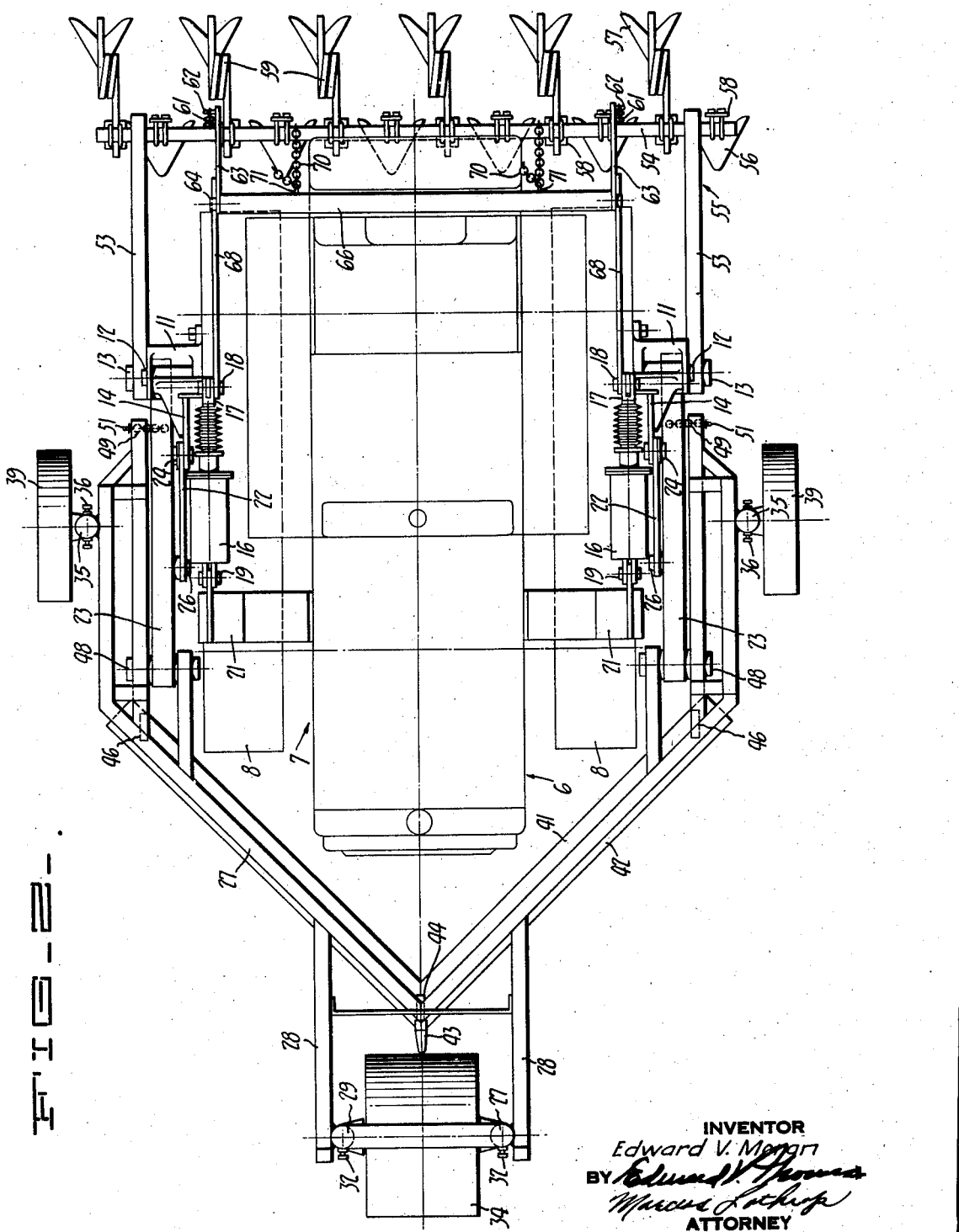

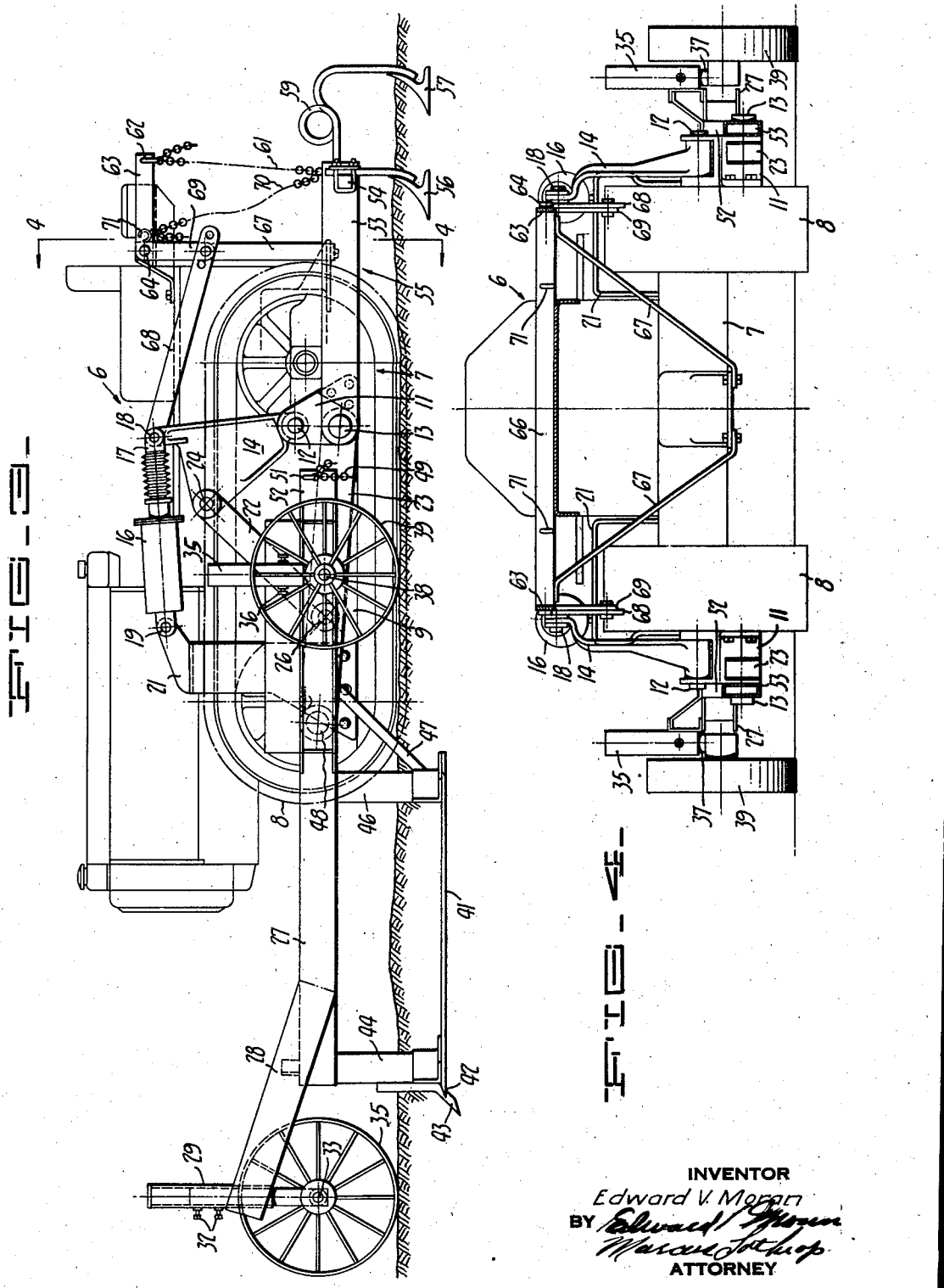

Patented July 23, 1946

2,404,518

UNITED STATES PATENT OFFICE 2,404,518

TRACTOR IMPLEMENT

Edward V. Moran, Billings, Mont., assignor to La Plant-Choate Manufacturing Co., Inc., Cedar Rapids, Iowa, a corporation of Iowa Application February 27, 1941, Serial No. 380,925

13 Claims. (Cl. 97—47)

My invention relates to means adapted to be powered by a tractor or comparable vehicle especially for use in clearing unwanted growth from the soil. The structure is especially practical in contending with weed growth such as morning-glory and is herein described in that connection, although it is to be appreciated that various other beneficial utilizations are possible with little or no change in the disclosed structure.

In the eradication of weeds such as morning-glory from relatively large acreages, various methods have been tried, but in the present instance the method is to work the ground below the surface, under some circumstances disturbing the surface as little as possible, and under other circumstances, not only to work the ground below the surface, but likewise superficially to till the soil leaving the earth after working in a friable condition. One of the preferred techniques is to go over the same area a number of times. The first trip over the terrain is with a tool which will sever the morning-glory vines a short distance below the surface of the ground, which is effective to kill a large proportion of the growth. Subsequently, however, when some of the growth may have reappeared, a second trip over the terrain is made, but the severance of the vines takes place at a greater depth below the surface. A similar traverse of the ground may be made later on and at a lower depth. In all of these instances the severance of the vines may be followed by a tillage of the soil.

The terrain being treated usually includes relatively narrow and small spaces, and especially in the event it is necessary to work very close to barriers such as ditches, fences, and the like, it is important that the tool utilized be readily maneuverable in exceedingly cramped quarters.

In accordance with the foregoing it is an object of my invention to provide a tractor implement usable in the eradication of morning-glory and comparable unwanted growths.

Another object of my invention is to provide a tractor implement which can be utilized in conjunction with standard tractors and tractor equipment.

A further object of my invention is to provide a tractor implement having a tool which can be maintained at a selected depth on or below the surface of the ground.

A further object of my invention is to provide a tractor implement which is readily maneuverable in cramped quarters.

A further object of my invention is to provide a tractor implement which is capable not only of eradicating growth, but of tilling the soil.

A further object of my invention is to provide a tractor implement which is readily raised and lowered under the control of the tractor operator.

A further object of my invention is to provide a tractor implement which is generally an improvement in structures for combatting unwanted growths.

The foregoing and other objects are attained in the embodiment of the invention illustrated in the drawings, in which Fig. 1 is a side elevation of a tractor implement constructed in accordance with my invention and applied to a standard tractor, the structure being shown in raised position.

Fig. 2 is a plan of my tractor implement.

Fig. 3 is for the most part a side elevation similar to Fig. 1, but being in part a section on a longitudinal vertical plane showing the structure in operating position.

Fig. 4 is a cross-section, the plane of which is indicated by the line 4—4 of Fig. 3.

Figure 1:
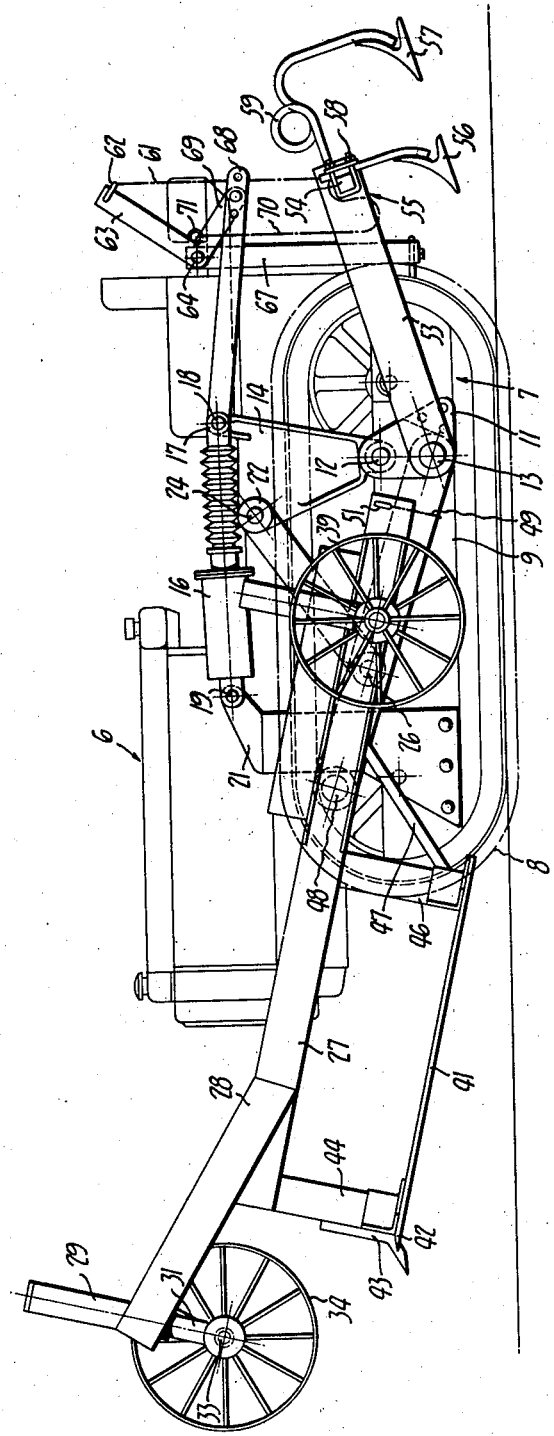

In its preferred form the tractor implement of my invention is designed to be applied to a tractor and includes a front frame having ground-engaging supports so that the front frame can float with respect to the tractor and likewise includes a rear frame, the front and rear frames being arranged to be simultaneously operated by the vehicle operator. On the front frame is a tool for severing the roots of the unwanted growth below the surface of the ground and on the rear frame are tillage tools. There are provided means for alternatively operating the front tool alone or in conjunction with the rear tools.

While the tractor implement of my invention is susceptible to utilization under a wide variety of circumstances and in conjunction with tractors of many different kinds, it has been successfully embodied as shown herein, applied to a track laying tractor 6. This includes a tractor main frame and body 7 at either side of which are disposed track laying elements 8. Since the structure at opposite sides of the longitudinal center line is substantially identical, the description of but one side is applicable to both. Each of the track laying elements 8 has a frame 9 on which is fastened a fitting 11 affording an upper pivot 12 and a lower pivot 13. On the upper pivot 12 is a generally triangular plate 14 adapted to be rotatably oscillated by a double-acting, hydraulically extensible chamber 16 having a piston rod 17 projecting therefrom and secured to a pivot connection 18 on the plate 14. The opposite end of the chamber 16 is connected by a pin 19 to a supporting frame 21 fastened on the track frame 9.

The two chambers 16 on opposite sides of the tractor are connected by a hydraulic control structure (not shown) for operation by the tractor operator. This hydraulic control structure is standard and permits the vehicle operator to rock the plates 14 on opposite sides of the vehicle simultaneously to the rear or simultaneously to the front. The motion of the plate 14 is transmitted by a link 22 to an arm 23, which at one end is mounted on the pivot 13. The link 22 is included in the motion train by a pivot 24 fastening one end of the link to the plate 14 and by a pin 26 fastening the other end of the link to the arm 23. The arm 23 thus not only partakes of the general movement of the tractor, but is likewise raised and lowered at its forward end with respect to the ground by the operation of the hydraulic cylinders 16 and the interposed linkage.

In accordance with my invention I provide around the front end of the tractor a front frame 27 preferably fabricated of substantially standard metal shapes and being substantially in the form of a V in plan with its apex leading. In accordance with my invention the frame 27 is arranged sometimes to be supported directly upon the ground and at other times to be entirely supported upon the tractor 6. In accordance with these characteristics, the forward end of the frame 27 is provided with a pair of projecting beams 28 which are connected to a pair of sleeves 29 within which are telescopically received tubes 31 secured in any vertically adjusted position by setscrews 32. The tubes support a front axle 33 on which a ground-engaging wheel 34 is rotatable. Comparably, on each side of the frame 27 adjacent its rearmost portion there is included a sleeve 35 having setscrews 36 to secure adjustably in any selected vertical position, a tube 37 forming the support for the axle 38 of a side ground-engaging wheel 39. The two side wheels 39 and the front wheel 34 are effective to support the frame 27 with respect to the ground, and by suitably locating the several tubes 31 and 37 within the sleeve 29 and 35, the frame 27 can be established within maximum limits at any selected elevation with regard to the ground.

Advantage of the adjustable positioning of the front frame is taken by utilizing the frame as the mounting for a ground working tool 41. While this tool can vary a good deal in its particular characteristics, depending upon the precise type of work which is to be done, in the present instance it is shown in a form which has proved practically successful. This comprises a blade V shaped in plan disposed with its apex forwardly and constituted by a plate having a sharpened forward edge 42 at the apex of which a breaking tooth 43 is provided. The blade 41 is disposed substantially parallel to the frame 27 by means of a post 44 at the apex of the blade which depends from the apex of the frame 27 substantially immediately behind the wheel 34, and by a pair of posts 46, each of which is secured to the blade 41 adjacent its trailing and transversely spaced terminals and which depends from the frame 27 in the regions of maximum divergence. Preferably the posts 44 and 46 are detachably secured to the plate 41 so that different tools can be interchanged. In addition, the posts 46 are provided with adequate braces 47 to resist the cutting thrusts of the blade 41. With the arrangement described, the blade 41 is maintained at any selected depth below the surface of the ground and serves to sever the roots of unwanted growth in the soil.

In order to advance the blade 41 at the selected level, the frame 27 adjacent the maximum divergence of the V, straddles on both of its ends the pivot pins 48 which are mounted in the forward ends of the arms 23 so that thrust is transmitted to the frame 27 from the tractor 6 through the brackets 11 and pivots 13 and by means of the arms 23 and the pivots 48 into the frame 27. Each arm 23, being pivoted at 13 upon the corresponding track frame 9, is free to rock somewhat as the tractor 6 moves over the ground. Thus, the tractor although serving as the advancing implement and being effective to propel the blade 41 through the ground, can rock, shift and tip due to undulations in the terrain more or less independently of the movement of the frame 27, the general plane of which is established by the three point support afforded by the wheels 39 and 34.

In maneuvering the structure and in transporting it, and also under certain circumstances during its operation, especially to avoid rocks or stumps and the like, I provide means for restricting the relative floating motion of the frame 27 with respect to the tractor 6, and consequently provide means such as chains 49 which can manually be adjusted to any desired link on a fixed hook 51 so that the trailing ends 52 of the frame 27 can be more or less securely lashed to the adjacent arms 23. When the chains are so lashed, the frame 27 and the arms 23 become virtually one integral unit and the operation of the hydraulic members 16 is effected to raise the frame 27 and to lift the blade 41 out of the ground, or conversely, to lower or force the frame and the blade into the ground, at least insofar as is permitted by the setting of the wheels 34 and 39.

Particularly as shown in Fig. 1, the entire front frame structure can be lifted entirely out of the ground and with the wheels spaced a substantial distance from the ground. This is the normal transporting position of the structure and any position between this upper maximum and the lower maximum with the blade 41 well into the ground can be effectuated. In addition, under some conditions of operation, I provide an intermediate amount of floating by lashing the chains 49 in an intermediate position so that some play is permitted, but so that the frame 27 is not entirely free to float with regard to the remaining part of the tractor structure. Some flexibility between the frame 27 and the tractor 6, however, is very desirable under most all operating conditions, in order that the pitching of the tractor will not disturb the smooth advance of the blade 41 at the selected depth.

Under some conditions of operation the forward frame 27, with its accompanying structure as described, is entirely adequate in and of itself to provide the desired amount of ground working. That is, the surface of the ground is disturbed as little as possible and the blade 41 effectuates its purpose by operating beneath the surface of the ground simply as a severing instrumentality. Under other conditions of operation, however, it is desired in addition to utilization of the blade 41, to provide some tillage tool for leaving the surface of the ground more or less pulverized. For that reason on the pivots 13 I mount a rear frame 55. On each pivot 13 I provide a rearwardly extending beam 53 which is joined to a square crossbar 54, on which a plurality of tillage tools 56 and 57 are adjustably clamped by fixtures 58. The tools 56 are arranged with their shanks substantially vertical while the tools 57 are arranged with horizontal coil spring shanks 59 for more substantial yielding.

While my invention is not limited to any specific types of tillage tools 56 and 57, it is evident that the tilling operation may be advantageously accomplished by a ripping action such as the illustrated tools, for example, are adapted to perform. Therefore, a suitable type of tool may be appropriately designated as a ripper tooth and the rear frame assembly as a ripper unit. By the same token, the beams 53 may be referred to as ripper arms.

The bar 54 is provided with a pair of chains 61, each of which is adjustably secured on the hooked end 62 of a bell crank 63 mounted by a pivot 64 at the end of a cross-beam 66 secured on the back of the tractor body 7 and securely held in place by braces 67. An adjustable link 68 connects the pivot 18 with the short arm 69 of the bell crank 63. Upon operation of the hydraulic chambers 16, the links 68 rotate the bell cranks 63 and through the chains 61 raise and lower the bar 54 and with it the tillage tools 56 and 57. Since this operation of the chambers 16 likewise moves the front frame 27, the structure is such in accordance with my invention, that the rear frame 55 is raised out of the ground simultaneously with the raising of the front frame 27, and the tools 56 and 57 are lowered simultaneously with the lowering of the plate 41. Thus, under the single control of the operator, I provide means both ahead of and behind the tractor, for concurrent operation upon the ground.

Under some circumstances I prefer to render the tools 56 and 57 inoperative and consequently afford a pair of slack chains 70 engaging hooks 71 in the bar 66. When the chains 70 are shortened, the chains 61 are disconnected, or are slack, and the operation of the chambers 16, while still effective to rotate the bell cranks 63, is ineffective to produce movement of the rear frame 55, or of the tools 56 and 57.

With the arrangement as described, the entire structure can be mounted on a standard tractor and can be readily transported by the tractor, when the parts are hydraulically positioned as shown in Fig. 1. For operation, the tools 41, 56 and 57 are lowered into the ground and the work proceeds. In very close quarters the hydraulic structure can be operated to lift the tools directly out of the ground so that the vehicle can readily be turned, or so that the vehicle having been advanced substantially to an obstruction such as a ditch or fence, and cutting very close thereto, can then be reversed and turned. Furthermore, the front tool 41 can be operated individually and without the rear tools 56 and 57, or as an alternative, both sets of tools can be raised or lowered simultaneously. Of considerable further importance is the fact that the blade 41 can be set at exactly the desired depth below the surface of the ground, and will maintain itself substantially at that depth despite the pitching and rocking of the tractor, since the tractor and the front frame 27 are capable of relative floating movement, while the propulsive force is being transmitted.

I claim:

1. A tractor implement comprising a tractor, a front frame V shape in plan disposed with its apex ahead of the tractor, wheels for supporting the frame directly upon the ground at more than two points, a ground working tool V shape in plan mounted on said frame, and thrust means between and pivoted to said frame and pivoted to said tractor.

2. A tractor implement comprising a frame V shape in plan adapted to be disposed with its apex leading, wheels for supporting said frame directly upon the ground at more than two points, a ground working tool depending from said frame, and thrust means pivotally secured to said frame and extending rearwardly therefrom.

3. A tractor implement comprising a frame V shape in plan adapted to be disposed with its apex leading, a front ground-engaging wheel adjacent the apex of said frame, ground-engaging side wheels adjacent the sides of said frame, a ground working tool V shape in plan depending from said frame with its apex leading, and thrust members articulated on said frame and extending rearwardly.

4. In a combined tool and ripper, for attachment to a tractor, the combination of: a pair of push-arms; means supportable by the tractor, for raising and lowering these arms; a tool, carried by these arms; two ripper arms; the push-arm and the ripper arm on each side being pivotally supported by the tractor at points closely adjacent to each other; a link pivoted on each push-arm; means for operatively connecting each link to an adjacent ripper arm; ripper teeth carried by the ripper arms; and means for supporting the ripper arms, directly by the tractor in inactive elevated position.

5. In a combined pushed tool and pulled tool, for attachment to a tractor, the combination of: a pushed tool; means for attaching this tool to a tractor so that it may be pushed thereby; means, carried by the tractor, for moving this tool into and out of operative position; a pulled tool; means whereby this pulled tool may be pulled by the tractor; means whereby the pulled tool can be operatively connected to the pushed tool so as to be moved into and out of operative position by the motion of the pushed tool; and means whereby the pulled tool, although still maintaining its pulling connection to the tractor, but operatively disconnected from the pushed tool, can be locked in raised position, inactive in spite of motion of the pushed tool.

6. In a combined pushed tool and pulled tool, for attachment to a tractor, the combination of: a pushed tool; means for attaching this tool to a tractor so that it may be pushed thereby; a pulled tool; means whereby this pulled tool may be pulled by the tractor; means, carried by the tractor, for moving one tool into and out of operative position; means, whereby said one tool can be operatively connected to the other tool so as to be moved into and out of operative position by the motion of the other tool; and means whereby said one tool, although still maintaining its operative connection to the tractor, but operatively disconnected from the other tool, can be locked in raised position, inactive in spite of motion of the other tool.

7. In a combined pushed tool and pulled tool for attachment to a tractor, the combination of a pair of push arms, a pair of pull arms, means supported by the tractor for raising and lowering these arms, a pushed tool carried by the push arms, a pulled tool carried by the pull arms, the push arm and the pull arm on each side of the tractor being pivotally supported upon the tractor, a linkage mechanism operatively connecting said push arms and said pull arms to said raising and lowering means, and means for supporting the pulled tool in inactive elevated position.

8. In a combined pushed tool and pulled tool for attachment to a tractor, the combination of a pushed tool, means for attaching this tool to a tractor so that it may be pushed thereby, means carried by the tractor for moving this tool into and out of operative position, a pulled tool, means whereby this pulled tool may be pulled by the tractor, a linkage mechanism whereby the pulled tool can be operatively connected to the pushed tool in such manner that the raising and lowering of the pushing means will act through the said linkage mechanism to raise and lower the pulling means, and means whereby the pulled tool although still maintaining its pulling connection to the tractor can be locked in raised position inactive in spite of motion of the pushed tool.

9. In a combined pushed tool and pulled tool for attachment to a tractor, the combination of a pushed tool, means for attaching this tool to a tractor so that it may be pushed thereby, a pulled tool, means whereby this pulled tool may be pulled by the tractor, means carried by the tractor for moving the said tools into and out of operative positions, means whereby one tool can be operatively connected to the other tool in such manner that the motion of the means for moving the one tool into and out of operating position is imparted by that means through the connecting means to the means for moving the other tool into and out of operating position, and means whereby said one tool although still maintaining its operative connection to the tractor but operatively disconnected from the other tool can be locked in raised position, inactive in spite of motion of the other tool.

10. A combined attachment according to claim 4, further characterized by the fact that the link serves to raise the ripper arms when the push arms are raised and to lower the ripper arms when the push arms are lowered.

11. A combined attachment according to claim 5, further characterized by the fact that said tool connecting means serves to raise the pulled tool when the pushed tool is raised and to lower the pulled tool when the pushed tool is lowered except when the pulled tool is locked in raised position.

12. In a combined pushed tool and pulled tool for attachment to a tractor, the combination of a pair of push arms, a pair of pull arms, means supported by the tractor for raising and lowering these arms, a pushed tool pivotally mounted on the push arms, a pulled tool carried by the pull arms, the push arm and the pull arm on each side of the tractor being pivotally supported upon the tractor, adjustable means limiting pivotal movement between said pushed tool and said push arms, and a linkage mechanism operatively connecting said push arms and said pull arms to said raising and lowering means.

13. In a combined pushed tool and pulled tool for attachment to a tractor, the combination of a pair of push arms, a pair of pull arms, means supported by the tractor for raising and lowering these arms, a pushed tool carried by the push arms, a pulled tool carried by the pull arms, the push arm and the pull arm on each side of the tractor being pivotally supported upon the tractor at points closely adjacent to each other, a linkage mechanism operatively connecting said push arms and said pull arms to said raising and lowering means, and means for supporting the pulled tool directly by the tractor in inactive elevated position.

EDWARD V. MORAN.